United States Patent
Salyer et al.

(10) Patent No.: US 9,783,373 B1
(45) Date of Patent: Oct. 10, 2017

(54) VENEER TRANSPORTING APPARATUS

(71) Applicant: Sweed Machinery, Inc., Gold Hill, OR (US)

(72) Inventors: Chris J. Salyer, Central Point, OR (US); Tyler W. Casebeer, White City, OR (US)

(73) Assignee: SWEED MACHINERY, INC., Gold Hill, OR (US)

( * ) Notice: Subject to any disclaimer, the term of this patent is extended or adjusted under 35 U.S.C. 154(b) by 0 days.

(21) Appl. No.: 15/207,804

(22) Filed: Jul. 12, 2016

(51) Int. Cl.
  *B65G 47/36* (2006.01)
  *B65G 15/12* (2006.01)
  *B65G 35/00* (2006.01)
  *B65G 41/00* (2006.01)
  *B65G 47/244* (2006.01)
  *B65G 21/20* (2006.01)

(52) U.S. Cl.
  CPC ............. *B65G 47/36* (2013.01); *B65G 15/12* (2013.01); *B65G 21/2036* (2013.01); *B65G 35/00* (2013.01); *B65G 41/001* (2013.01); *B65G 47/244* (2013.01); *B65G 2201/0282* (2013.01)

(58) Field of Classification Search
  CPC ...... B65G 47/36; B65G 35/00; B65G 41/001; B65G 47/244; B65G 2201/0282; B65G 15/04; B65G 15/10; B65G 15/12; B65G 15/14; B65G 15/20; B65G 21/2027; B65G 21/2036
  USPC .............................................. 198/689.1, 817
  See application file for complete search history.

(56) References Cited

U.S. PATENT DOCUMENTS

| | | | | |
|---|---|---|---|---|
| 3,227,275 A * | 1/1966 | Cody | ........................ | B07C 5/14 198/689.1 |
| 4,651,984 A * | 3/1987 | Emrich | ..................... | B65H 5/24 198/689.1 |
| 5,139,253 A * | 8/1992 | Bohme | ..................... | B65H 5/24 271/197 |
| 5,967,510 A * | 10/1999 | Ono | ........................ | B41J 11/007 271/196 |
| 6,131,901 A * | 10/2000 | Hirohata | ................. | B65H 29/32 271/188 |
| 7,810,635 B2 * | 10/2010 | Kim | ................... | H01L 21/67748 198/465.1 |
| 7,909,159 B1 * | 3/2011 | Zats | ........................ | B65G 15/12 198/586 |
| 2005/0109588 A1 * | 5/2005 | Gariglio | ................. | B65G 15/58 198/817 |

(Continued)

*Primary Examiner* — Mark A Deuble
(74) *Attorney, Agent, or Firm* — Renner, Otto, Boisselle & Sklar, LLP

(57) ABSTRACT

An apparatus for transporting veneer sheets, where the veneer sheets each have an upper surface, a lower surface, and a plurality of edges connecting the upper surface to the lower surface. The apparatus includes a vacuum source and a conveyor for transporting individual sheets of veneer along a direction of travel to a predetermined location. The conveyor includes a belt running in the direction of travel. A vacuum opening adjacent the belt is in communication with the vacuum source to draw respective sheets of veneer to the belt by suction applied to the upper surface or the lower surface of the veneer sheets via the vacuum opening. The position of the conveyor is adjustable in a direction transverse the direction of travel to accommodate veneer sheets having different lengths.

19 Claims, 8 Drawing Sheets

(56) References Cited

U.S. PATENT DOCUMENTS

| | | | |
|---|---|---|---|
| 2009/0121417 A1* | 5/2009 | Nishimura | B65G 21/2036 271/225 |
| 2011/0139581 A1* | 6/2011 | Umezawa | B65G 15/12 198/570 |
| 2011/0139584 A1* | 6/2011 | Gilmartin | B29D 29/06 198/617 |
| 2013/0048471 A1* | 2/2013 | Capps, Jr. | B65G 15/58 198/692 |
| 2016/0244276 A1* | 8/2016 | Witte | B65G 21/2018 |

* cited by examiner

VENEER TRANSPORTING APPARATUS

TECHNICAL FIELD

The present invention relates generally to a veneer transporting apparatus, and more particularly to a veneer transporting apparatus that is adjustable for use with veneer sheets of varying size.

BACKGROUND

A veneer is a thin layer of material, typically wood, but also potentially metal, polymer or ceramic. A layer of veneer may be used as a protective or ornamental facing, such as on the outside surface of a sheet of particle board. Or multiple layers of veneer may be bonded together, as in the formation of plywood.

A veneer transporting apparatus is commonly used to transport sheets of veneer to a stacking position where they are stacked into piles according to various characteristics, such as size, thickness, moisture content, or quality grade. In a typical veneer transporting apparatus, a veneer sheet, or series of veneer sheets, is carried along a conveyor to a stacking position where the veneer sheet or sheets are then removed from the conveyor and stacked.

SUMMARY

The known veneer transporting apparatus is typically arranged to handle veneer sheets of only a certain length or within a narrow range of lengths, where the length is measured in a direction transverse to the direction of travel of the veneer sheets. Because veneer sheets can vary in length from about four feet (1.2 meters) up to about 10 feet (3 meters), multiple transporting apparatuses may be used to accommodate the different lengths.

An aspect of the present invention is to provide improvements to a veneer transporting apparatus that would allow for the use of a single veneer transporting apparatus for a range of lengths or even all lengths of veneer.

A typical veneer sheet includes an upper surface, a lower surface, and edges connecting the upper surface and the lower surface, the edges including a leading edge, a trailing edge, and two side edges extending longitudinally between the leading edge and the trailing edge.

An exemplary apparatus for transporting veneer sheets may include a vacuum source and a conveyor for transporting individual sheets of veneer along a direction of travel to a predetermined location. The conveyor may include a belt running in the direction of travel, and a vacuum opening adjacent the belt that is in communication with the vacuum source to draw respective sheets of veneer to the belt by suction applied to the upper surface or the lower surface of the veneer sheets via the vacuum opening. The position of the conveyor may be adjustable in a direction transverse the direction of travel.

In some embodiments, the position of the vacuum source may be adjustable in a direction transverse the direction of travel.

In some embodiments, the conveyer may further include an aligner for aligning a side edge of the veneer with the direction of travel. The aligner may include a contact surface arranged parallel to the direction of travel for contacting the side edge of the veneer.

In some embodiments, the aligner may further include an aligner actuator configured to drive the contact surface in a direction transverse the direction of travel.

In some embodiments, the position of the aligner with respect to the conveyer may be adjustable in a direction transverse the direction of travel.

In some embodiments, the apparatus for transporting veneer sheets may further include a conveyer actuator for adjusting the position of the conveyor in a direction transverse the direction of travel.

In some embodiments, the apparatus for transporting veneer sheets may further include a control unit for controlling the conveyor actuator and an input unit for entering a desired position of the conveyer corresponding to the length of the veneer sheets into the control unit.

In another aspect, an exemplary apparatus for transporting veneer sheets may include a conveyor for transporting individual sheets of veneer along a direction of travel to a predetermined location. The conveyor may include a belt running in the direction of travel, a vacuum source, and a vacuum opening adjacent the belt that is in communication with the vacuum source to draw respective sheets of veneer to the belt by suction applied to the upper surface or the lower surface of the veneer sheets via the vacuum opening. The position of the conveyor may be adjustable in a direction transverse the direction of travel.

In some embodiments, the conveyer may further include an aligner for aligning a side edge of the veneer with the direction of travel. The aligner may include a contact surface arranged parallel to the direction of travel for contacting the side edge of the veneer.

In some embodiments, the aligner may further include an aligner actuator configured to drive the contact surface in a direction transverse the direction of travel.

In some embodiments, the position of the aligner with respect to the conveyor may be adjustable in a direction transverse the direction of travel.

In some embodiments, the apparatus for transporting veneer sheets may further include a conveyer actuator for adjusting the position of the conveyor in a direction transverse the direction of travel.

In some embodiments, the apparatus for transporting veneer sheets may further include a control unit for controlling the conveyer actuator and an input unit for entering a desired position of the conveyer corresponding to the length of the veneer sheets into the control unit.

In another aspect, an exemplary apparatus for transporting veneer sheets may include a pair of conveyors for transporting individual sheets of veneer along a direction of travel to a predetermined location. Each of the pair of conveyors may include a belt running in the direction of travel, a vacuum source, and a vacuum opening adjacent the belt that is in communication with the vacuum source to draw respective sheets of veneer to the belt by suction applied to the upper surface or the lower surface of the veneer sheets via the vacuum opening. The position of at least one of the pair of conveyors may be adjustable in a direction transverse the direction of travel.

In some embodiments, at least one of the pair of conveyers may further include an aligner for aligning a side edge of the veneer with the direction of travel. The aligner may include a contact surface arranged parallel to the direction of travel for contacting the side edge of the veneer.

In some embodiments, the aligner may further include an aligner actuator configured to drive the contact surface in a direction transverse the direction of travel.

In some embodiments, the position of the aligner with respect to the conveyor may be adjustable in a direction transverse the direction of travel.

In some embodiments, the apparatus for transporting veneer sheets may further include a conveyer actuator for adjusting the position of the conveyer in a direction transverse the direction of travel.

In some embodiments, the apparatus for transporting veneer sheets may further include a control unit for controlling the conveyer actuator and an input unit for entering a desired position of the conveyer corresponding to the length of the veneer sheets into the control unit.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1:
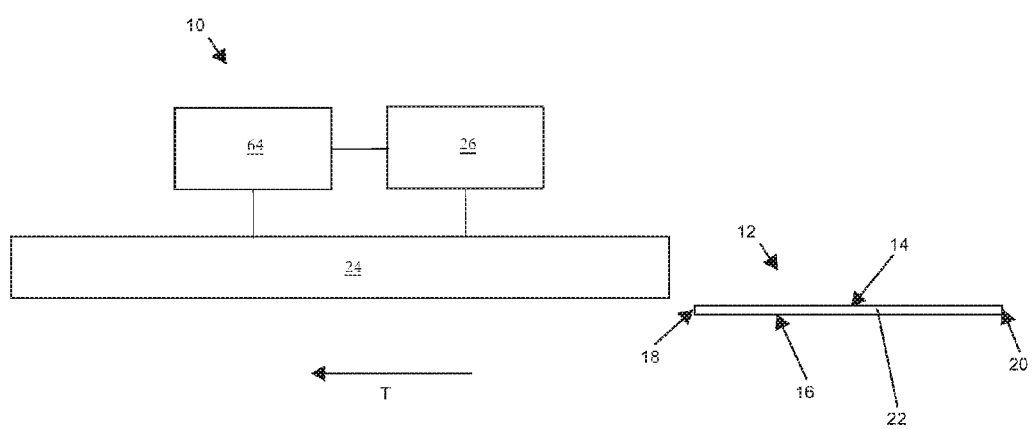
FIG. 1 is a schematic side view representation of an exemplary apparatus for transporting veneer sheets according to the invention.
Figure 2:
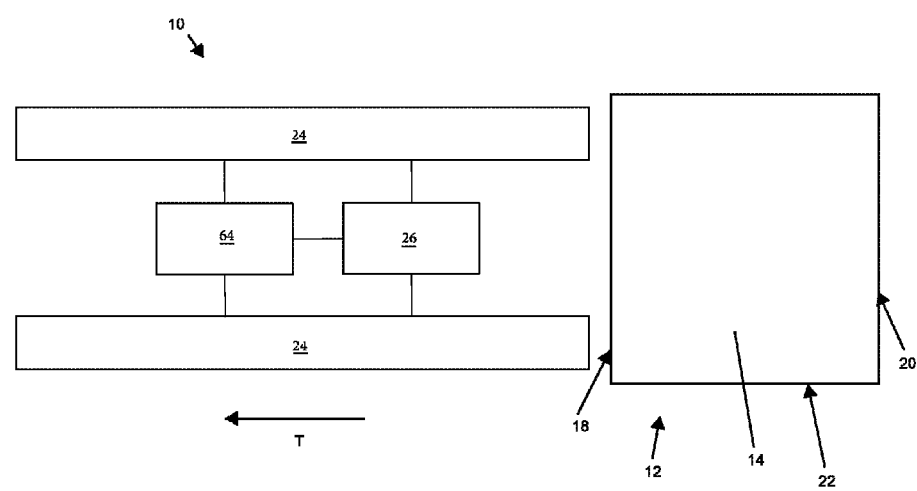
FIG. 2 is a schematic top view representation of an exemplary apparatus for transporting veneer sheets according to the invention.
Figure 3:
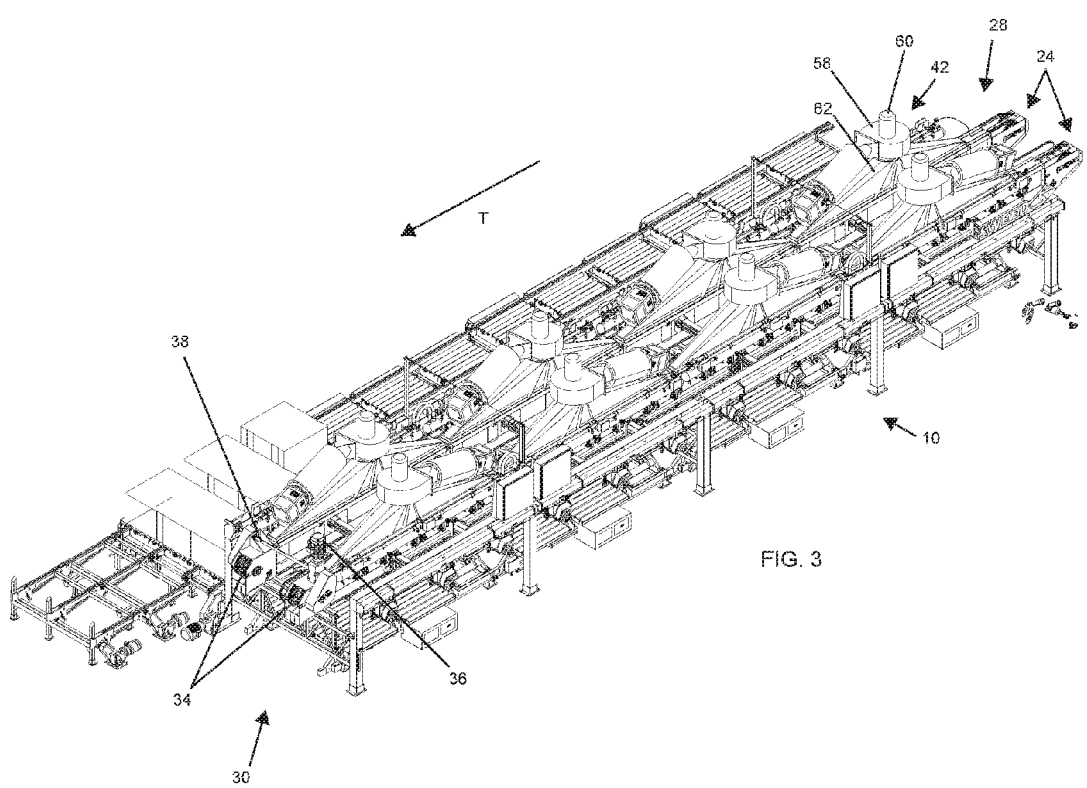
FIG. 3 is a perspective view of an exemplary apparatus for transporting veneer sheets according to the invention.

Turning now to FIGS. 1 and 2, a schematic illustration of an apparatus 10 for transporting veneer sheets 12 along a direction of travel T is presented. Each veneer sheet 12 includes an upper surface 14, a lower surface 16, and edges connecting the upper surface 14 and the lower surface 16, the edges including a leading edge 18 facing in the direction of travel T, a trailing edge 20 facing away from the direction of travel T, and two side edges 22 extending longitudinally between the leading edge 18 and the trailing edge 20 and facing transverse the direction of travel T. The veneer sheet 12 may be made of wood, plastic, metal, or composites thereof. The length of the veneer sheet 12, as measured in a direction transverse to the direction of travel T, may vary from about four feet (1.2 meters) up to about ten feet (3 meters). The veneer sheet 12 is very thin relative to its width and length, with typical thicknesses in the range of ¼ of an inch (6.35 mm) or less.

The apparatus 10 includes one or more conveyors 24 for transporting the veneer sheets 12 in a downstream direction along the direction of travel T. The apparatus 10 further includes a conveyor actuator 26 for adjusting the position of one or more of the conveyors 24 in a direction transverse the direction of travel T to accommodate veneer sheets of varying length.

As shown FIGS. 3-8, the apparatus 10 may include an infeed end 28 and an outfeed end 30. The overall direction of travel T for veneer sheets 12 on the apparatus 10 is from the infeed end 28 to the outfeed end 30 and this direction also may be referred to as the downstream direction. The upstream direction is opposite the downstream direction. Such an overall direction of travel T is shown generally in the various figures with reference to the directional arrows designated "T," where a circled X represents travel into the page. It should be understood that the terms "upstream," "downstream," "leading," and "trailing" as used herein refer to the arrangement of an exemplary veneer sheet 12 being transported in this manner by the apparatus 10.

At the infeed end 28 of the apparatus 10, a supply of veneer sheets 12 may be received for transport and stacking. The veneer sheets 12 may be received, for example, from a drying oven or from a holding pile. As the sheets move toward the outfeed end 30, they may be stacked according to various criteria, such as size, moisture content, and/or grade, for example. The stacked veneer may then be removed from the apparatus 10 for further processing.

Figure 7:
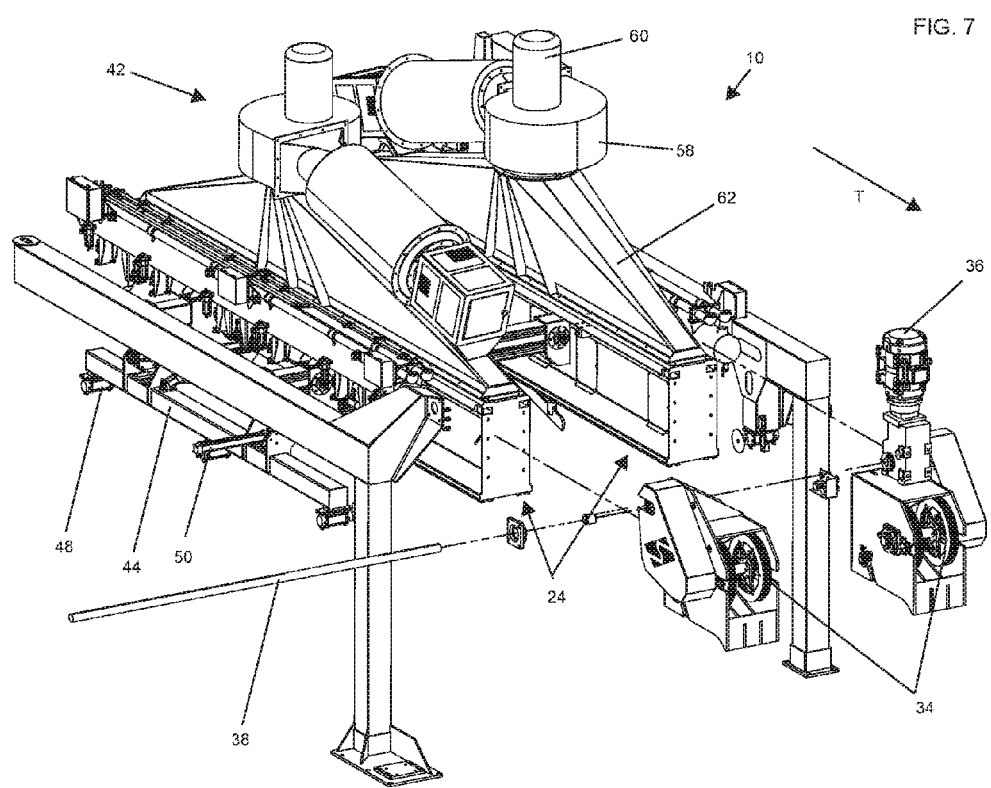
FIG. 7 is an enlarged perspective view of an end of an exemplary apparatus for transporting veneer sheets according to the invention.

With further reference to FIGS. 3-8, each conveyor 24 includes a belt 32 running in the direction of travel T, where the belt 32 may be a continuous surface or series of surfaces for carrying the veneer sheets 12 in the direction of travel T and defining a path of travel for the veneer sheets 12. Each belt 32 is supported on pulleys 34 and belt retainers and is driven by a belt drive motor 36. As shown in FIG. 7, a single belt drive motor 36 may be used to drive the belts 32 of multiple conveyors 24 via a common drive shaft 38.

Each conveyor 24 may also include a vacuum opening 40 adjacent the belt 32 that is in communication with a vacuum source 42 to draw respective veneer sheets 12 to the belt 32 by suction applied to the upper surface or the lower surface of the veneer sheets 12, as discussed in more detail below.

Figure 8:
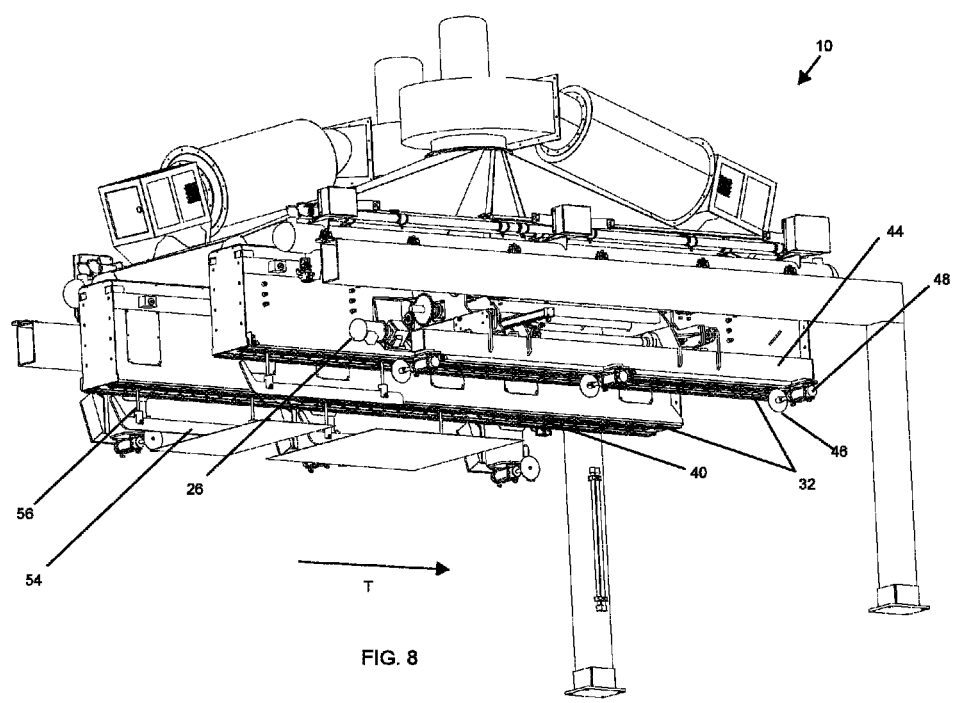
FIG. 8 is an enlarged perspective view of a portion of an exemplary apparatus for transporting veneer sheets according to the invention.

Further, as shown in FIG. 8, each conveyor 24 may include an aligner 44 for aligning one of the two side edges 22 of the veneer sheet 12 with the direction of travel T. The aligner 44 may include a contact surface 46 arranged parallel to the direction of travel T for contacting one of the two side edges 22 of the veneer sheet 12 and a contact surface actuator 48 configured to drive the contact surface 46 in a direction transverse the direction of travel T. In some embodiments, the position of the aligner 44 with respect to the conveyor 24 may be adjustable in a direction transverse the direction of travel T. For example, an aligner actuator 50 may be mounted on the conveyor 24 and configured to drive the aligner 44 in a direction transverse the direction of travel T.

Figure 4:
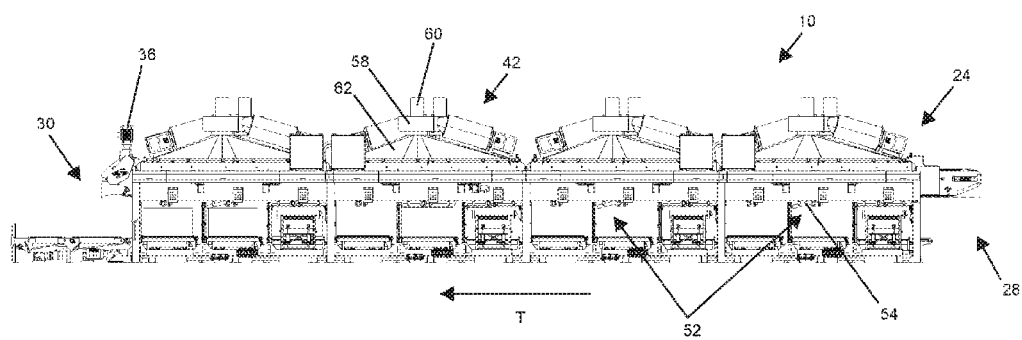
FIG. 4 is a side view of an exemplary apparatus for transporting veneer sheets according to the invention.
Figure 5:
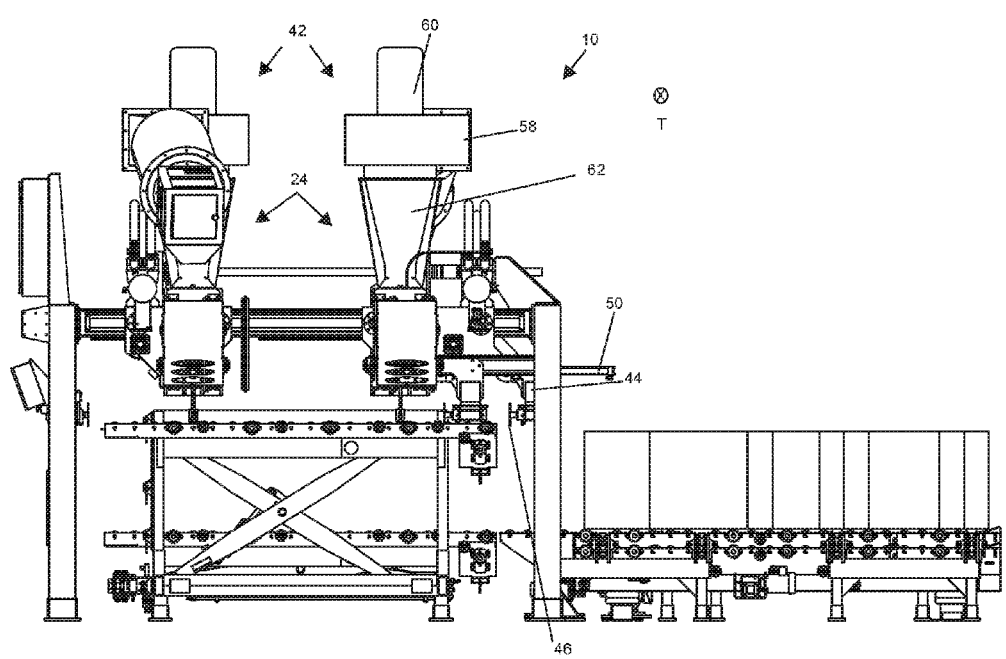
FIG. 5 is an end view of an exemplary apparatus for transporting veneer sheets according to the invention.
Figure 6:
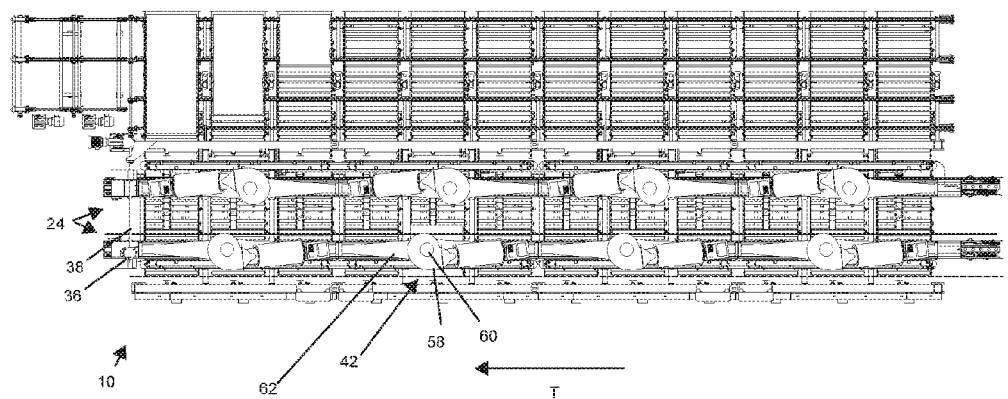
FIG. 6 is a top view of an exemplary apparatus for transporting veneer sheets according to the invention.

Referring now to FIGS. 4, 7, and 8, each conveyor 24 may also include one or more knockdowns 52 for separating the veneer sheets 12 from the belt 32. These knockdowns 52 alternatively may be mounted on the apparatus 10 independently from the conveyors 24. The knockdown 52 may include a knockdown shoe 54 configured to contact the veneer sheet 12 and a knockdown actuator 56 for driving the knockdown shoe 54 into the path of the veneer sheet 12 in a direction away from the vacuum opening 40.

In some embodiments, the position of one or more of the conveyors 24 may be adjustable in a direction transverse the direction of travel T. For example, as shown in FIG. 8, the apparatus 10 may include one or more conveyor actuators 26 configured to drive the conveyors 24 transverse the direction of travel T. The conveyor actuator 26 may be a mechanical actuator, such as a rack and pinion assembly, configured to drive the conveyor 24 along a rail positioned transverse the direction of travel T. Alternatively, the conveyor actuator 26 may be a hydraulic, pneumatic, electric, thermal, or magnetic actuator.

As shown in FIGS. 3-8, the apparatus 10 may further include one or more vacuum sources 42. The vacuum sources 42 may be mounted on the conveyors 24, as shown. Alternatively, they may be mounted on the apparatus 10 independently from the conveyors 24. Each vacuum source 42 may include a fan assembly 58, a fan drive motor 60 for driving the fan assembly 58, a plenum 62, and one or more ducts. When the fan assembly 58 is driven by the fan drive motor 60, air is drawn into the vacuum opening 40 and through the plenum 62, via ducts connecting the plenum 62 and vacuum opening 40. Where the vacuum source 42 is mounted independently from the conveyors 24, the ducts may be flexible to maintain a connection between the plenum 62 and the vacuum opening 40 when the position of the conveyors 24 is adjusted in a direction transverse the direction of travel T.

Referring to FIGS. 1 and 2, the apparatus 10 may further include a control unit 64 for controlling the position of the conveyors 24, the aligners 44, or both, in a direction transverse the direction of travel T to account for varying lengths of veneer sheets 12. For example, a processor in the control unit 64 can be programmed to send a control signal to operate one or both of the conveyor actuators 26 and the aligner actuators 50. The control unit 64 may include an input unit having an interface that allows an operator to set or to select a desired position of the conveyors 24 and aligners 44 in a direction transverse the direction of travel T. For example, the operator may manually enter a desired position of the conveyors 24 and aligners 44 in a direction transverse the direction of travel T corresponding to the length of the veneer sheets 12 to be transported, or may select from various pre-set desired positions of the conveyors 24 and aligners 44. The control unit 64 may then send a control signal to operate the conveyor actuators 26 or the aligner actuators 50, or both, to adjust the position of the conveyors 24, or the aligners 44, or both, in a direction transverse the direction of travel T.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" has the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An apparatus for transporting veneer sheets, the veneer sheets each having an upper surface, a lower surface, a leading edge, a trailing edge, and two side edges extending longitudinally between the leading edge and the trailing edge, the apparatus comprising:
   a vacuum source, and
   a conveyor for transporting individual sheets of veneer along a direction of travel to a predetermined location, wherein the conveyor comprises:
      a belt running in the direction of travel,
      a vacuum opening adjacent the belt that is in communication with the vacuum source to draw respective sheets of veneer to the belt by suction applied to the upper surface of the veneer sheets via the vacuum opening, and at least one knockdown configured to separate a transported veneer sheet from the belt while the vacuum source is drawing the transported veneer sheet to the belt, the at least one knockdown including:
a knockdown shoe, and
a knockdown actuator configured to drive the knockdown shoe into the path of the transported veneer sheet in a direction away from the vacuum opening, wherein the position of the conveyor is adjustable in a direction transverse the direction of travel.

2. The apparatus of claim 1, wherein the position of the vacuum source is adjustable in a direction transverse the direction of travel.

3. The apparatus of claim 1, wherein the conveyer further comprises an aligner for aligning a side edge of the veneer with the direction of travel, the aligner including a contact surface arranged parallel to the direction of travel for contacting a side edge of the veneer.

4. The apparatus of claim 3, wherein the aligner further comprises a contact surface actuator configured to drive the contact surface in a direction transverse the direction of travel.

5. The apparatus of claim 3, wherein the position of the aligner with respect to the conveyor is adjustable in a direction transverse the direction of travel.

6. The apparatus of claim 1, wherein the apparatus further comprises a conveyer actuator for adjusting the position of the conveyer in a direction transverse the direction of travel.

7. The apparatus of claim 6, wherein the apparatus further comprises a control unit for controlling the conveyer actuator and an input unit for entering a desired position of the conveyer into the control unit.

8. An apparatus for transporting veneer sheets, the veneer sheets each having an upper surface, a lower surface, a leading edge, a trailing edge, and two side edges extending longitudinally between the leading edge and the trailing edge, the apparatus comprising
a conveyor for transporting individual sheets of veneer along a direction of travel to a predetermined location,
wherein the conveyor comprises:
a belt running in the direction of travel,
a vacuum source,
a vacuum opening adjacent the belt that is in communication with the vacuum source to draw respective sheets of veneer to the belt by suction applied to the upper surface of the veneer sheets via the vacuum opening, and
at least one knockdown configured to separate a transported veneer sheet from the belt while the vacuum source is drawing the transported veneer sheet to the belt, the at least one knockdown including:
a knockdown shoe, and
a knockdown actuator configured to drive the knockdown shoe into the path of the transported vender sheet in a direction away from the vacuum opening, wherein the position of the conveyor is adjustable in a direction transverse the direction of travel.

9. The apparatus of claim 8, wherein the conveyer further comprises an aligner for aligning a side edge of the veneer with the direction of travel, the aligner including a contact surface arranged parallel to the direction of travel for contacting a side edge of the veneer.

10. The apparatus of claim 9, wherein the aligner further comprises a contact surface actuator configured to drive the contact surface in a direction transverse the direction of travel.

11. The apparatus of claim 9, wherein the position of the aligner with respect to the conveyor is adjustable in a direction transverse the direction of travel.

12. The apparatus of claim 8, wherein the apparatus further comprises a conveyer actuator for adjusting the position of the conveyer in a direction transverse the direction of travel.

13. The apparatus of claim 12, wherein the apparatus further comprises a control unit for controlling the conveyer actuator and an input unit for entering a desired position of the conveyer into the control unit.

14. An apparatus for transporting veneer sheets, the veneer sheets each having an upper surface, a lower surface, a leading edge, a trailing edge, and two side edges extending longitudinally between the leading edge and the trailing edge, the apparatus comprising a pair of conveyors for transporting individual sheets of veneer along a direction of travel to a predetermined location,
wherein each of the pair of conveyors comprises:
a belt running in the direction of travel,
a vacuum source,
a vacuum opening adjacent the belt that is in communication with the vacuum source to draw respective sheets of veneer to the belt by suction applied to the upper surface of the veneer sheets via the vacuum opening, and
as least one knockdown configured to separate a transported veneer sheet from the belt while the vacuum source is drawing the transported veneer sheet to the belt, the at least one knockdown including:
a knockdown shoe, and
a knockdown actuator configured to drive the knockdown shoe into the path of the transported veneer sheet in a direction away from the vacuum opening, wherein the position of at least one of the pair of conveyors is adjustable in a direction transverse the direction of travel.

15. The apparatus of claim 14, wherein at least one of the pair of conveyers further comprises an aligner for aligning a side edge of the veneer with the direction of travel, the aligner including a contact surface arranged parallel to the direction of travel for contacting a side edge of the veneer.

16. The apparatus of claim 15, wherein the aligner further comprises a contact surface actuator configured to drive the contact surface in a direction transverse the direction of travel.

17. The apparatus of claim 15, wherein the position of the aligner with respect to the conveyor is adjustable in a direction transverse the direction of travel.

18. The apparatus of claim 14, wherein the apparatus further comprises a conveyer actuator for adjusting the position of the conveyer in a direction transverse the direction of travel.

19. The apparatus of claim 18, wherein the apparatus further comprises a control unit for controlling the conveyer actuator and an input unit for entering a desired position of the conveyer into the control unit.

* * * * *